March 2, 1954   H. B. STONER ET AL   2,670,491
SPREADING IMPLEMENT
Filed Aug. 17, 1950
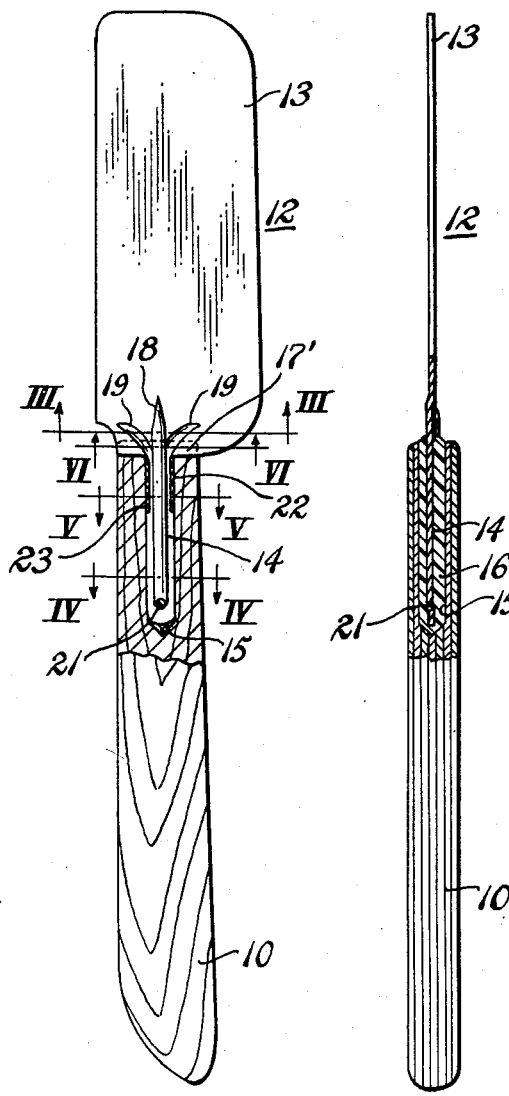
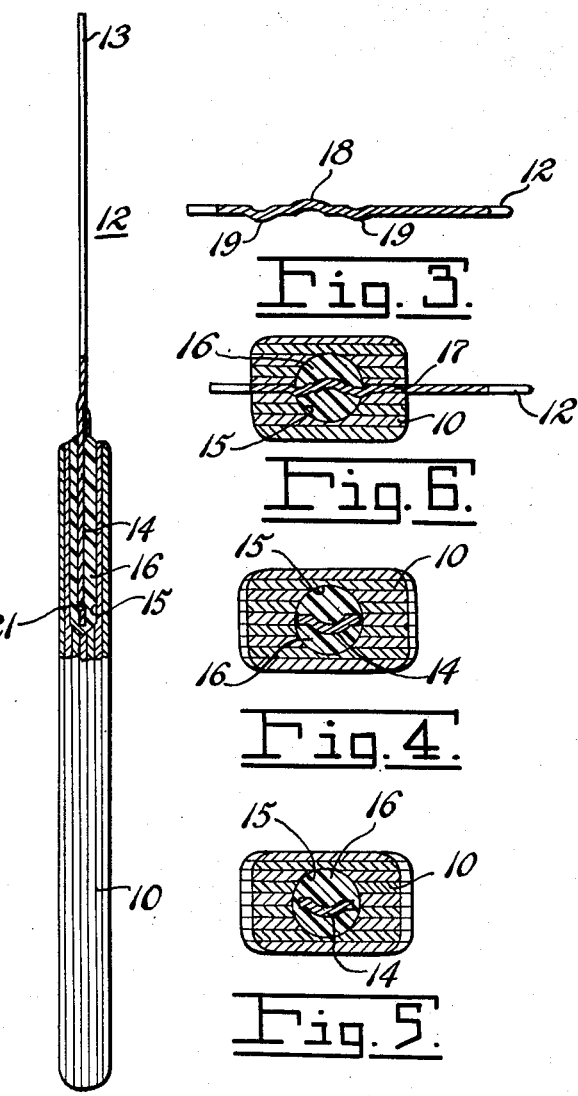
INVENTOR.
HAROLD B. STONER
BY RICHARD W. ANGERT
Zugelter & Zugelter
Attys.

Patented Mar. 2, 1954

2,670,491

UNITED STATES PATENT OFFICE 2,670,491

SPREADING IMPLEMENT

Harold B. Stoner and Richard W. Angert,
Cincinnati, Ohio

Application August 17, 1950, Serial No. 180,022

2 Claims. (Cl. 15—236)

This invention relates to a spreading implement having a resiliently flexible, spring-like blade and more particularly to an implement for spreading pasty materials such as sandwich spreads, soft cheeses, and the like.

An object of this invention is to provide an implement of this type having a blade which is stiff at its base and spring-like in its main portion.

A further object of this invention is to provide an implement of this type having a blade and shank or tang of uniform thickness throughout.

A further object of this invention is to provide an implement of this type having a handle which is cemented to the blade shank.

A further object of this invention is to provide an implement of this type in which a tang at the base or root of the blade is cemented in a socket in the end of the handle.

A further object of this invention is to provide an implement of this type in which the base of the blade is received in a slot in the handle to lock the blade against turning, the blade being reinforced at its base by one or more corrugations to resist flexing of the root or base of the blade as the main portion of the blade flexes.

The above and other objects and features of the invention will in part be apparent and will in part be obvious from the following detailed description, and the drawing, in which Fig. 1 is a view in side elevation, partly broken away and in section, of a spreading implement constructed in accordance with an embodiment of this invention;

Fig. 2 is a view in end elevation, partly broken away and in section, of the implement illustrated in Fig. 1;

Fig. 3 is a view in section taken along a line III—III of Fig. 1;

Fig. 4 is a view in section taken along a line IV—IV of Fig. 1;

Fig. 5 is a view in section taken along a line V—V of Fig. 1; and

Fig. 6 is a view in section taken along a line VI—VI of Fig. 1.

In the following detailed description, and the drawing, like reference characters indicate like parts.

In Figs. 1 and 2, a spreading implement is illustrated which includes a handle 10 and a blade 12. The blade comprises a main or body portion 13 and a tang or shank 14 extending from one end of the body portion, that is, from the root of the blade. The tang is received in a blind bore or socket 15 in one end of the handle and is cemented in the socket by cement 16. At the mouth of the socket, the handle is provided with a transverse slot 17 (Fig. 6) in which the root or base 17' of the blade is received. Slot 17 serves to resist turning of the blade shank in the handle and reduces or minimizes strain on the cement.

The blade is formed from a single piece of relatively thin springy sheet metal which bends or flexes when used for spreading pasty materials such as sandwich spreads, soft cheese, butter or the like. Stainless steel sheet of a thickness of approximately 0.016 inch has been found to be a suitable material for the blade.

As shown in Fig. 2, the blade is of uniform thickness throughout its length. Strength and stiffness is imparted to the tang and to the portion of the body of the blade adjacent the tang by a main corrugation 18 and by corrugations 19 symmetrically arranged on opposite sides of the main corrugation. As shown in Fig. 1, the main corrugation extends a limited distance into the body of the blade. The symmetrically arranged or side corrugations radiate from the blade end of the tang into the base of the blade, and, as shown, may be slightly concave outwardly and extend along the body of the blade a shorter distance than the main corrugation and at an angle of approximately 45° to the main corrugation.

As shown in Figs. 3 and 6 the main corrugation extends on one side of the blade while the side corrugations extend on the other side so that the corrugations resist flexing of the root end of the blade in both directions. The corrugations prevent substantial flexing of the root end of the blade while permitting the major portion of the blade to flex readily. The particular arrangement of corrugations shown has been found to be particularly desirable, for the blade shown can flex smoothly on both sides of its normal position without any snap in the action thereof. The corrugations serve two major functions. First, the corrugations strengthen the root end of the blade where the main portion of the blade merges into the handle resisting breaking at this point where the blade is weakest. Second, the corrugations resist flexing of the portion of the blade received in slot 17 so that the tendency of the blade to spread the handle at the slot is minimized.

The blade is firmly anchored in the socket of the handle by the cement. As shown in Fig. 1, an opening 21 extends through the tang which opening is filled with the cement. In addition, the tang is provided with a neck 22 of reduced width at the blade end thereof in which the cement is received so that, as shown in Fig. 5, the cement forms a collar extending completely around the tang adjacent the blade. The end of the tang remote from the blade, on the other hand, is wider than neck 22 and extends completely across the socket so that a shoulder 23 is formed in the tang. This shoulder is engaged by the cement. The cement surrounding the neck of the tang grips the shoulder to prevent the blade and tang from pulling free of the handle.

The handle is formed of a material with which the cement forms a strong and permanent bond. In the form of the device shown, the handle is formed from a series of laminations of wood which are bonded together with a resinous material, for example a phenol-formaldehyde type resin which impregnates the wood and holds the laminations together. A cement, for example a phenolic base thermosetting cement is employed which forms a strong bond with the impregnated wood laminations so that the plug of cementing material and blade are firmly anchored in the socket of the handle.

The resin impregnated wood handle shown in the drawing and described above forms a preferred type of handle, but the handle may be formed of other material with which the cement can form a strong durable bond.

The spreading implement described above and illustrated in the drawing is subject to structural modification without departing from either the spirit or the scope of the invention as set forth in the appended claims.

Having described our invention, what we claim as new and desire to secure by Letters Patent is:

1. A spreading blade formed from a flat sheet of resilient metal having uniform thickness which comprises a body portion and a tang extending from one end thereof, said tang having a linear corrugation, the linear corrugation extending into the body of the blade, and symmetrically arranged corrugations radiating from the blade end of the tang into the body of the blade on opposite sides of the linear corrugation, the corrugations terminating in the body portion of the blade a limited distance from the tang, the symmetrical corrugations being disposed in one face of the blade, and the linear corrugation being disposed in the other face thereof, whereby the tang end of the blade is relatively stiff and rigid and the remainder of the blade flexes smoothly.

2. A spreading blade formed from a flat sheet of resilient metal having uniform thickness which comprises a body portion and a tang extending from one end thereof, said tang having a linear corrugation, the linear corrugation extending into the body of the blade in one face of the blade, and another corrugation on each side of the linear corrugation projecting from the blade end of the tang at an angle to the linear corrugation and extending into the other face of the blade, the corrugations terminating in the body portion of the blade a limited distance from the tang, the corrugations rendering the tang end of the blade relatively stiff and rigid, the remainder of the blade being adapted to flex smoothly.

HAROLD B. STONER.
RICHARD W. ANGERT.

References Cited in the file of this patent

UNITED STATES PATENTS

| Number | Name | Date |
|---|---|---|
| 342,697 | Johnson | May 25, 1886 |
| 437,325 | Barclay | Sept. 30, 1890 |
| 1,529,124 | Glidden | Mar. 10, 1925 |
| 2,072,581 | Curtis | Mar. 2, 1937 |
| 2,425,215 | West | Aug. 5, 1947 |